Dec. 20, 1955   R. T. SIMMONS   2,727,974
ELECTRIC HEATING APPARATUS
Filed April 9, 1953   2 Sheets-Sheet 1
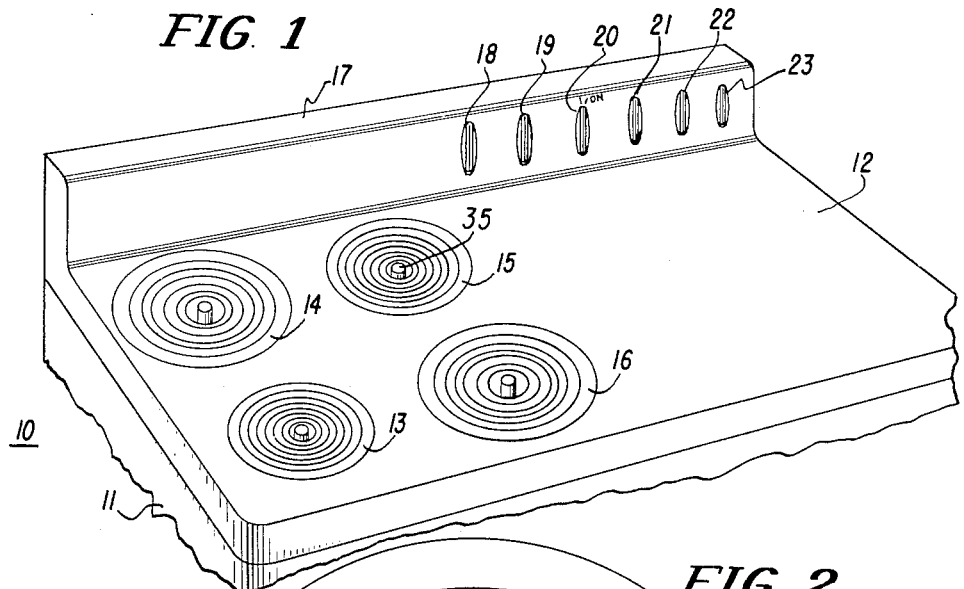
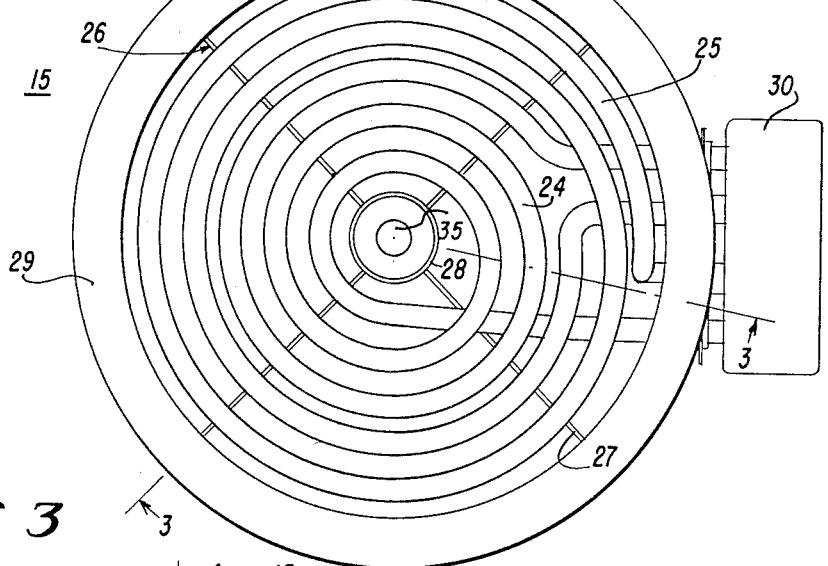
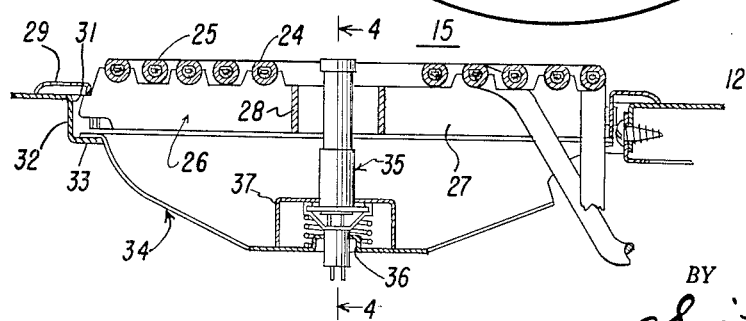
INVENTOR.
Russell T. Simmons
BY
Smith, Olsen + Baird
Attys.

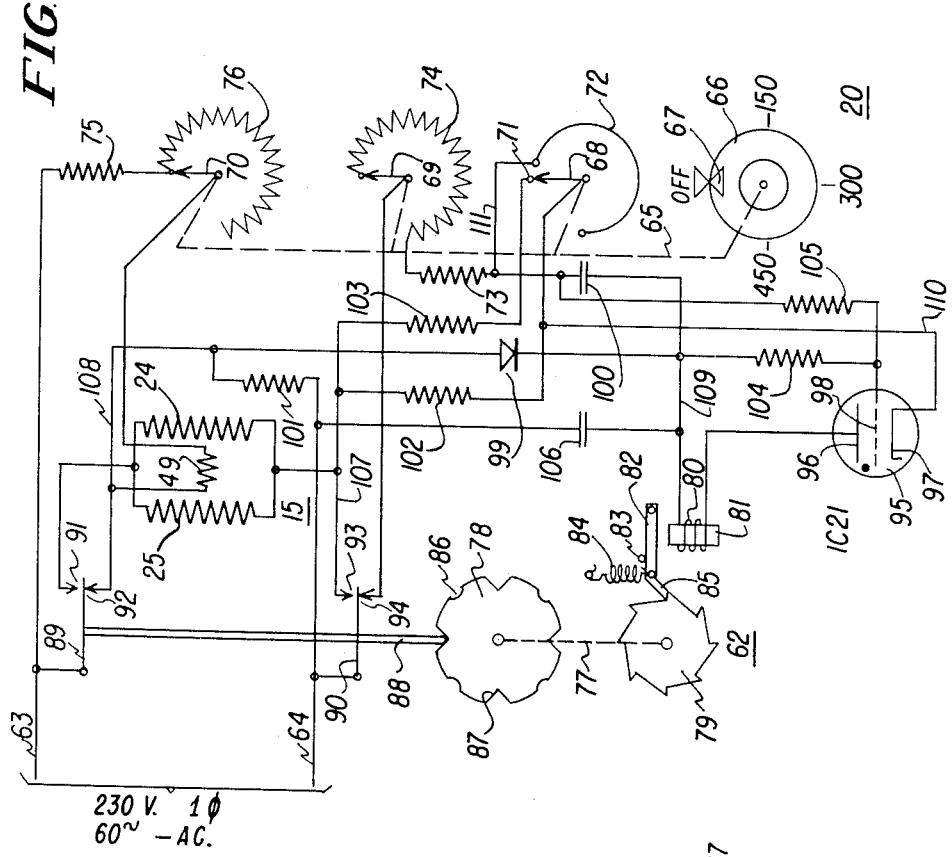
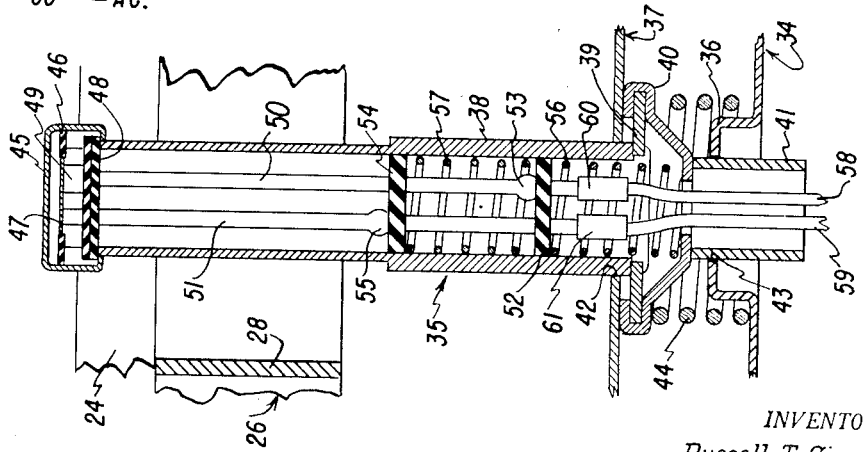

United States Patent Office 2,727,974
Patented Dec. 20, 1955

2,727,974

ELECTRIC HEATING APPARATUS

Russell T. Simmons, Bellwood, Ill., assignor to General Electric Company, a corporation of New York Application April 9, 1953, Serial No. 347,811

13 Claims. (Cl. 219—20)

The present invention relates to electric heating apparatus and more particularly to such apparatus incorporating an improved arrangement for controlling and regulating the average electric power supplied to an electric heating unit therein as a basis for establishing and maintaining the temperature of a cooperating cooking vessel, or the like, disposed in heat exchange relation with the heating unit.

In electric heating apparatus, it has been proposed that the average electric power supplied to an electric heating unit may be selectively regulated by varying the ratio between the time interval during which the heating unit is energized ("on" time) and the time interval during which the heating unit is deenergized ("off" time) as a basis for establishing and regulating the temperature of a cooperating cooking vessel, or the like, disposed in heat exchange relation with the heating unit. Such an arrangement conventionally comprises a continuously operating cyclic switch for alternately establishing the two time intervals mentioned; the cyclic switch also accommodating adjustment of the ratio between the two time intervals for the purpose of controlling the average electric power supplied to the heating unit.

While an arrangement of the character described is reasonably satisfactory for the purpose of selectively regulating the average electric power supplied to the heating unit, it is subject to the criticism that the initial "heating-up" time interval of the heating unit, and the supported cooking vessel, from an ambient temperature is unduly long, since the regulated average electric power normally supplied to the heating unit is ordinarily only a small fraction of the full wattage rating of the heating unit; whereby the arrangement is entirely unsatisfactory in operation, as a long "heating-up" time interval of the heating unit and the supported cooking vessel cannot be tolerated.

Accordingly, it is a general object of the present invention to provide in electric heating apparatus of the character described, an improved electric control arrangement that effects the supply to the electric heating unit of full electric power during the initial "heating-up" time interval thereof, and the supported cooking vessel, and until the temperature of the supported cooking vessel reaches substantially the desired cooking temperature, and that then effects the supply to the electric heating unit of the regulated and reduced average electric power for the purpose of maintaining the temperature of the supported cooking vessel substantially at the desired cooking temperature.

Another object of the invention is to provide in electric heating apparatus of the character described, an improved circuit network that accommodates ready adjustment and preselection of the desired cooking temperature of the cooking vessel supported by the heating unit.

Another object of the invention is to provide in electric heating apparatus of the character described, an improved circuit network that embodies a combination "off-variable on" control switch for selectively presetting the desired cooking temperature of the cooking vessel supported by the heating unit.

A further object of the invention is to provide in electric heating apparatus of the character described, an improved circuit network that functions as a timer to establish the "on" time and the "off" time of the heating unit so as to regulate the average electric power supplied thereto, only after the supported cooking vessel reaches substantially the desired cooking temperature.

A further object of the invention is to provide in electric heating apparatus of the character described, a timer circuit for the purpose of selectively establishing the "on" time and the "off" time of the heating unit, and a control arrangement for selectively blocking the timing operation of the timer circuit depending upon the temperature of the cooking vessel supported by the heating unit.

A still further object of the invention is to provide in electric heating apparatus of the character described, a timer circuit for the purpose of selectively establishing the "on" time and the "off" time of the heating unit, and a control arrangement for selectively blocking the timing operation of the timer circuit that includes a thermistor disposed in cooperating heat exchange relation with the cooking vessel supported by the heating unit.

Further features of the invention pertain to the particular arrangement of the elements of the electric heating apparatus and of the control circuit network therefor, whereby the above-outlined and additional operating features thereof are attained.

The invention, both as to its organization and method of operation, together with further objects and advantages thereof, will best be understood by reference to the following specification taken in connection with the accompanying drawings, in which:

Figure 1 is a fragmentary front perspective view of the upper portion of an electric range incorporating electric heating apparatus embodying the present invention;

Fig. 2 is an enlarged plan view of one of the electric heating units incorporated in the electric range shown in Fig. 1;

Fig. 3 is an enlarged vertical sectional view of the electric heating unit, taken in the direction of the arrows along the offset line 3—3 in Fig. 2;

Fig. 4 is a greatly enlarged fragmentary vertical sectional view of the electric heating unit, taken in the direction of the arrows along the line 4—4 in Fig. 3, illustrating the construction of the temperature sensing element incorporated therein and forming a part of the electric control circuit; and Fig. 5 is a diagram of the electric control circuit for the electric heating unit shown in Figs. 2 and 3.

Referring now to Fig. 1 of the drawings, there is illustrated an electric range 10 incorporating electric heating apparatus embodying the features of the present invention and comprising an upstanding body 11 provided with a substantially horizontally disposed cooking top 12 supporting a plurality of surface heating units or hot plates 13, 14, 15 and 16 arranged in spaced-apart relation in a substantially rectangular pattern on the left-hand side thereof. The body 11 houses an oven, not shown, in the right-hand portion thereof and a compartment, not shown, in the left-hand portion thereof, the oven and the compartment being respectively provided with front doors, not shown.

The cooking top 12 carries an upstanding backsplash 17 adjacent to the rear thereof, that, in turn, carries a plurality of surface heating unit selector switches 18, 19, 20 and 21, an oven selector switch 22, and an oven temperature regulator or thermostatic switch 23, the elements 18 to 23, inclusive, being arranged in a row on the right-hand side of the backsplash 17. The selector switches 18, 19, 20 and 21 respectively correspond to the surface heating units 13, 14, 15 and 16 and are respectively included in the electric heating circuits thereof. Each of the selector switches 18, etc. is of the manually operable rotary type, described more fully hereinafter, and provided with a fixed "off" position and a variable "on" position for selectively establishing the desired temperature of a vessel, or the like, cooperating with the associated surface heating unit 13, etc., and supported thereby in heat exchange relation therewith.

The cooking top 12 has a plurality of openings therein that respectively receive the surface heating units 13, etc.; and each of the surface heating units 13, etc. may be fundamentally of the construction disclosed in United States Patent No. 2,565,443, granted on August 21, 1951, to Oliver G. Vogel and Francis E. Kirk. Accordingly, the surface heating unit 15, shown in Figs. 2 and 3, is of the hot-plate type including inner and outer helical coil sections 24 and 25; and each of the coil sections 24 and 25 may be of the metal sheath-helical resistance conductor type disclosed in United States Patent No. 1,367,341, granted on February 1, 1921, to Charles C. Abbott. The turns of the coil sections 24 and 25 are arranged in radially spaced-apart relation by an arrangement including a spider 26 provided with four angularly spaced-apart arms 27, etc., to which the turns of the coil sections 24 and 25 are selectively staked. The inner ends of the arms 27, etc. are fixed to a substantially centrally disposed annular collar 28; and the outer ends of the arms 27, etc. are secured to an annular surrounding trim ring 29. The spider 26 is pivotally mounted to the cooking top 12 by a suitable hinge mechanism, not shown, that may be of the construction of that disclosed in United States Patent No. 2,565,432, granted on August 21, 1951, to Francis E. Kirk; whereby the surface heating unit 15, as a whole, may be pivotally moved into and out of the associated opening provided in the cooking top 12, in a conventional manner. The ends of the coil sections 24 and 25 terminate in an associated terminal block 30 in which the connections to the electric control circuit are made.

As best shown in Fig. 3, the surface heating unit 15 is pivotally mounted in the opening 31 provided in the cooking top 12; which opening 31 is bounded by a depending annular flange 32 carried by the cooking top 12 and terminating in an inwardly radially extending annular ledge 33; that, in turn, carries a removable drip pan 34. In the central portion of the drip pan 34 there is resiliently mounted a movable temperature sensing element 35. Preferably the top surface of the coil sections 24 and 25 are flattened to provide a substantially horizontally disposed composite heating surface adapted to engage and to support the bottom wall of a cooking vessel, or the like; and the upper end of the temperature sensing element 35 projects through the annular collar 28 and terminates slightly above, about 1/16", the plane of the composite heating surface of the surface heating unit 15 so that the upper end of the temperature sensing element 35 is also engaged by the bottom wall of a cooking vessel supported upon the coil sections 24 and 25.

As best shown in Figs. 3 and 4, the central portion of the drip pan 34 is provided with an upwardly directed annular boss 36; and also carries a substantially inverted cup-shaped element 37 arranged above the boss 36; between which parts 36 and 37 the temperature sensing element 35 is resiliently secured in place. More particularly, the temperature sensing element 35 comprises a substantially tubular metal body 38 terminating at the lower end thereof in a metal ring 39 carrying a substantially cup-shaped metal cap 40, that, in turn, carries a depending metal tube 41. The lower end of the body 38 projects through a centrally disposed opening 42 provided in the cup-shaped element 37; and the tube 41 projects through a centrally disposed opening 43 provided in the boss 36; whereby the parts 39 and 40 are arranged between the bottom wall of the drip pan 34 and the cup-shaped element 37. Further a helical coil spring 44 is arranged in surrounding relation with respect to the boss 36 and the lower portion of the cap 40 and is disposed in compression urging the temperature sensing element 35 upwardly; whereby it will be understood that the temperature sensing element 35 is mounted for guided reciprocatory movement in the vertical direction in the openings 42 and 43; whereby the temperature sensing element 35 is moved downwardly out of its normal position against the bias of the coil spring 44, incident to the placement of a cooking vessel upon the coil sections 24 and 25, and the temperature sensing element 35 is subsequently returned upwardly back into its normal position by the coil spring 44, incident to the removal of the cooking vessel from the coil sections 24 and 25.

The closing cap 45, preferably formed of silver, is secured to the upper end of the body 38 and houses an insulating ring 46, that, in turn, carries a disk 47, preferably formed of silver, the disk 47 being arranged in spaced-apart relation to and below the top of the cap 45. Also housed within the cap 45 and disposed below the disk 47 are a pair of insulating disks 48; and arranged between the disks 47 and 48 is an element 49 having a very high negative temperature coefficient of resistance, and preferably a thermistor. The thermistor 49 comprises a ceramic-like block of sintered uranium oxide, and an oxide of magnesium, manganese, titanium, iron, nickel, cobalt, zinc, etc. A typical thermistor of this character has a temperature-resistance characteristic as follows:

| Temperature (° F.): | Resistance (ohms) |
| --- | --- |
| 74 | 12,000 |
| 111 | 4,800 |
| 200 | 1,150 |
| 306 | 400 |
| 360 | 360 |
| 450 | 310 |

The upper smooth face of the thermistor 49 engages the silver disk 47; and the lower smooth face of the thermistor 49 is engaged by the upper end of a terminal rod 50, after passing through aligned openings provided in the disks 48. Similarly, the upper end of another terminal rod 51 engages the silver disk 47, after passing through aligned openings provided in the disks 48. The principal body portions of the terminal rods 50 and 51 are housed within the body 38; and preferably the terminal rods 50 and 51 are also formed of silver. An insulating disk 52 is arranged as a piston in the lower end of the body 38 and engages a shoulder 53 provided on the lower end of the terminal rod 50; and likewise, an insulating disk 54 is arranged as a piston in the intermediate portion of the body 38 and engages a shoulder 55 provided on the intermediate portion of the terminal rod 51. Further, a coil spring 56 is arranged within the lower end of the body 38 in compression between the insulating disk 52 and the bottom of the cap 40; and likewise, a coil spring 57 is arranged within the intermediate portion of the body 38 in compression between the disks 52 and 54. Accordingly, the thermistor 49 is retained in compression between the upper end of the terminal rod 50 and the lower surface of the silver disk 47 by virtue of the bias of the coil spring 56; and the upper end of the terminal rod 51 is maintained in engagement with the lower surface of the silver disk 47 by virtue of the bias of the coil springs 56 and 57; whereby a good electric circuit path is established between the terminal rods 50 and 51 via the thermistor 49 and the silver disk 47. The extreme lower ends of the terminal rods 50 and 51 are respectively secured to two lead conductors 58 and 59 by two connectors 60 and 61 respectively.

In view of the foregoing description of the construction and arrangement of the temperature sensing element 35, it will be understood that the thermistor 49 is insulated against direct thermal contact with the body 38 and the cap 45, but being housed in the cap 45, is subject to a thermal influence that is dependent upon the temperature of the bottom wall of a vessel supported by the coil sections 24 and 25 of the surface heating unit 15, for a purpose more fully explained hereinafter. Also, it will be observed that the body 38 of the temperature sensing element 35 extends upwardly through and out of contact with the central annular collar 28 of the spider 26 in order to prevent the direct transmission thereto of heat from the coil sections 24 and 25 so as to prevent any undesired direct thermal influence upon the temperature sensing element 35 by the coil sections 24 and 25.

Referring now to Fig. 5, the heating control circuit for the surface heating unit 15 includes, in addition to the manually operable selector switch 20, a source of electric current supply of 230 volts, single-phase, 60 cycle, A. C., as well as an electromagnetic relay 62 of the ratchet type. More particularly, the source of current supply includes two line conductors 63 and 64; and the coil sections 24 and 25 of the surface heating unit 15 are directly connected in parallel circuit relation. The manually operable selector switch 20 is provided with an operating shaft 65 carrying on the outer end thereof a manual knob and dial 66 provided with an index 67 that cooperates with indicia carried by the adjacent surface of the backsplash 17. Also the operating shaft 65 carries three insulated electric contact wipers 68, 69 and 70. The wiper 68 comprises a portion of an "off-variable on" switch, also provided with a cooperating off contact button 71 and an arcuate on contact segment 72; whereby the wiper 68 engages the off contact button 71 in the "off" position of the switch 20 and engages the arcuate on contact segment 72 in the variable "on" position of the switch 20. The wiper 69 comprises a portion of a variable rheostat, including a fixed resistance section 73 and a cooperating variable resistance section 74. Similarly, the wiper 70 comprises a portion of a variable rheostat, including a fixed resistance section 75 and a cooperating variable resistance section 76. In the circuit arrangement, when the switch 20 occupies its "off" position all of the variable resistance section 74 is placed in series circuit relation with the fixed resistance section 73 by the wiper 69; and all of the variable resistance section 76 is removed from series circuit relation with the fixed resistance section 75. As the switch 20 is operated from its "off" position into its variable "on" position the wiper 69 progressively cuts-out the resistance section 74 and progressively cuts-in the resistance section 76 in a well-known manner. Finally, the switch 20 comprises stops, not shown, cooperating with the operating shaft 65 for the purpose of limiting rotation thereof at its opposite ends of travel.

The electromagnetic relay 62 comprises a rotatably mounted operating shaft 77 carrying an insulating control cam 78 and a ratchet wheel 79. Also the relay 62 comprises a winding 80 provided with a magnetic core 81 that is operatively associated with a magnetic armature 82 mounted for pivotal movement toward the core 81 and biased away from the core 81 against a stop 83 by a coil spring 84. The outer end of the armature 82 carries a pawl 85 that cooperates with the ratchet wheel 79. In the operation of the relay 62 when the winding 80 is energized, the armature 82 is attracted out of its normal position against the bias of the coil spring 84, whereby the pawl 85 rotates the ratchet wheel 79 one step; and subsequently when the winding 80 is deenergized the armature 82 is released so that it is returned back into its normal position by the coil spring 84 so that the pawl 85 is conditioned again to step the ratchet wheel 79 upon the next energization of the winding 80. The periphery of the insulating cam 78 is provided with a number of angularly disposed high indices or notches 86 and a number of intervening angularly disposed low indices or notches 87; which notches 86 and 87 cooperate with an associated insulating push rod 88 that carries two switch springs 89 and 90. The switch spring 89 is provided with respective front and back contacts 91 and 92; and similarly, the switch spring 90 is provided with respective front and back contacts 93 and 94. In the arrangement, the notches 86 and 87 are correlated with respect to the construction of the ratchet wheel 79 so that upon "odd" steps of the ratchet wheel 79 the lower end of the push rod 88 cooperates with one of the low notches 87 moving the push rod 88 to close the back contacts 92 and 94, and so that upon "even" steps of the ratchet wheel 79 the lower end of the push rod 88 cooperates with one of the high notches 86 moving the push rod 88 to close the front contacts 91 and 93. Thus it will be understood that in the normal "odd" position of the relay 62 the push rod 88 cooperates with one of the low notches 87 in the cam 78 so that the front contacts 91 and 93 are opened and the back contacts 92 and 94 are closed, and in the operated "even" position of the relay 62 the push rod 88 cooperates with one of the high notches 86 in the cam 78 so that the front contacts 91 and 93 are closed and the back contacts 92 and 94 are opened.

Also the control circuit comprises a gaseous discharge triode 95 that may be of type "1C21" and including an anode 96, a cathode 97, and a control grid 98. Further, the control circuit includes a dry rectifier 99 that may be of the selenium type "5GH1," as well as a charging capacitor 100 and a plurality of resistors 101, 102, 103, 104 and 105, together with a filtering capacitor 106.

In the circuit arrangement, the switch springs 89 and 90 are respectively connected to the line conductors 63 and 64; the stationary front contact 91 is connected to the junction between two of the terminals of the coil sections 24 and 25; and the stationary front contact 93 terminates a conductor 107, that, in turn, is connected to the junction between the other two terminals of the coil sections 24 and 25. The stationary back contact 92 terminates a conductor 108; and the stationary back contact 94 is connected directly to the wiper 69. One terminal of the thermistor 49 is connected to the conductor 108, and the other terminal thereof is connected directly to the wiper 70. The line conductor 63 is connected to the terminal of the resistance section 75; and the line conductor 64 is connected via the resistor 101 to the conductor 108. One terminal of the winding 80 is connected to a conductor 109, and the other terminal thereof is connected to the anode 96. The rectifier 99 is connected between the conductors 108 and 109; and the cathode 97 is connected to a conductor 110, that, in turn, is connected directly to the wiper 68. The terminal of the resistance section 73 is connected to a conductor 111, that, in turn, is directly connected to the arcuate "on" contact segment 72, the "off" contact button 71 being connected to one terminal of the resistor 103, and the other terminal of the resistor 103 being connected to the conductor 107. The resistor 102 is connected between the conductors 107 and 110; the charging capacitor 100 is connected between the conductors 111 and 109; and the filtering capacitor 106 is connected between the line conductor 64 and the conductor 109. The control grid 98 is commonly connected to one terminal of each of the resistors 104 and 105, the other terminal of the resistor 104 being connected to the conductor 109, and the other terminal of the resistor 105 being connected to the conductor 111; thereby to provide a biasing circuit for the control grid 98.

In the circuit network, the two coil sections 24 and 25, when connected in parallel relation across the line conductors 63 and 64 supplied from the source of current noted, may develop a wattage of approximately 2050 watts; the charging capacitor 100 may have a capacitance of 40 microfarads; and the filtering capacitor 106 may have a capacitance of 10 microfarads. The resistor 102 may have a resistance of 40,000 ohms; the fixed resistance section 73 may have a resistance of 1 megohm; the variable resistance section 74 may have a resistance of 2 megohms; the fixed resistance section 75 may have a resistance of 1,000 ohms; the variable resistance section 76 may have a resistance of 9,000 ohms; the resistor 103 may have a resistance of 1,000 ohms; the resistors 104 and 105 may each have a resistance of 1 megohm; and the resistor 101 may have a resistance of 7,000 ohms.

Considering now the operation of the control circuit, when the selector switch 20 occupies its normal "off" position, the relay 62 normally occupies its "odd" position illustrated; whereby the coil sections 24 and 25 are deenergized and the tube 95 is rendered non-conductive. Also at this time, the line conductor 63 is connected via the back contacts 92 to the conductor 108, and the line conductor 64 is connected via the back contacts 94 to the wiper 69 and thence via the resistance sections 74 and 73 in series relation to the conductor 111; whereby the rectifier 99 is operated to produce a potential upon the conductor 109 so that the charging condenser 100 is charged across the conductors 109 and 111. Further, the thermistor 49 and the resistance section 75 are short-circuited in series relation via the wiper 70, the line conductor 63, the back contacts 92 and the conductor 108; and the filtering condenser 106 is connected directly across the conductor 109 and the line conductor 64. Hence at this time, the charging condenser 100 is fully charged by the voltage appearing on the conductor 109 as developed by the rectifier 99.

Now in order to carry out a cooking operation upon the surface heating unit 15, the person places the food to be cooked in an appropriate cooking vessel and supports the cooking vessel upon the coil sections 24 and 25 so that the temperature sensing element 35 is moved downwardly from its normal position in order that the top of the cap 45 is in good thermal contact with the bottom wall of the cooking vessel. The person then determines the temperature at which the food is to be cooked, such for example, as 300° F., and correspondingly operates the control knob 66 of the selector switch 20. As the selector switch 20 is operated out of its "off" position the wiper 68 disengages the "off" contact button 71 and engages the arcuate "on" contact segment 72; while the wipers 69 and 70 are adjustably set with respect to the cooperating resistance sections 74 and 76. When the wiper 68 engages the arcuate "on" contact segment 72, the fully charged charging capacitor 100 is connected via the conductors 111, 110 and 109 and through the winding 80 across the anode 96 and the cathode 97 of the tube 95; whereby the tube 95 is rendered conductive so that the charging capacitor 100 is discharged through the winding 80 and the tube 95. Accordingly, the winding 80 is energized to attract the armature 82 so that the ratchet wheel 79 is rotated one step, the cam 78 being rotated from its "odd" position into its "even" position; whereby the back contacts 92 and 94 are opened and the front contacts 91 and 93 are closed. When the charging capacitor 100 is thus discharged through the winding 80 and the tube 95, the tube 95 is rendered non-conductive; whereby the winding 80 is deenergized so that the armature 82 is released in order that the pawl 85 may be conditioned again subsequently to step the ratchet wheel 79.

Closure of the front contacts 91 and 93 connects the parallel connected coil sections 24 and 25 directly across the line conductors 63 and 64 so that the surface heating unit 15 is heated effecting heating of the cooking vessel supported thereby. Opening of the back contacts 92 interrupts the path for shorting in series relation the thermistor 49 and the resistance sections 75 and 76; while opening of the back contacts 94 interrupts the initial circuit for charging the charging capacitor 100 via the resistance sections 73 and 74. Finally closure of the front contacts 93 completes an alternative circuit for charging the charging capacitor 100 that includes the resistance sections 75 and 76, the wiper 70, the thermistor 49, the conductor 108, the rectifier 99, the conductor 109, the conductor 111, the arcuate "on" contact segment 72, the wiper 68, the conductor 110, the resistor 102 and the conductor 107. This alternative series circuit for charging the charging capacitor 100 includes not only the thermistor 49 but the resistance sections 75 and 76; whereby the charging rate is exceedingly low by virtue of the very high resistance of the thermistor 49 as it is cold at this time; whereby the charging capacitor 100 is not immediately charged to a voltage sufficiently high (about 150 volts) again to render conductive the tube 95. However, as time proceeds the temperature of the cooking vessel supported by the surface heating unit 15, as well as the food contained therein, rises from the ambient temperature since the coil sections 24 and 25 are energized at the full wattage of 2050 watts. Accordingly, as time proceeds the temperature of the thermistor 49 rises above the ambient temperature; whereby the resistance thereof sharply decreases due to the very steep negative temperature coefficient of resistance thereof; whereby the composite resistance of the alternative charging circuit is reduced effecting a corresponding increase in the voltage applied across the charging capacitor 100 and the consequent increase in the charge accumulated therein. After an appropriate time interval, of the order of several minutes, the temperature of the cooking vessel approaches the previously set 300° F.; whereby the resistance of the thermistor 49 is sufficiently reduced so that the voltage applied across the charging capacitor 100 is sufficiently increased to bring about conduction of the tube 95; whereby the capacitor 100 is again discharged via the winding 80 and the tube 95 so that the ratchet wheel 79 is stepped from its "even" position into its "odd" position in order to cause the insulating cam 78 to control the push rod 88 so that the front contacts 91 and 93 are again opened and the back contacts 92 and 94 are again closed. Opening of the front contacts 91 and 93 again deenergizes the parallel connected coil sections 24 and 25; closure of the back contacts 92 again short-circuits the thermistor 49 in series circuit relation with the resistance sections 76 and 75; opening of the contacts 93 interrupts the alternative circuit for charging the charging capacitor 100; and closure of the contacts 94 again completes the original circuit for charging the charging capacitor 100 via the resistance sections 73 and 74.

Accordingly at this time, the charging capacitor 100 is quickly charged in about 52 seconds in order again to render conductive the tube 95 so that the ratchet wheel 79 is again operated into its "even" position effecting opening of the back contacts 92 and 94 and closure of the front contacts 91 and 93. Accordingly at this time, the charging capacitor 100 is again charged via the alternative circuit including the thermistor 49 and the resistance sections 75 and 76. However at this time, the resistance of the thermistor 49 is quite low, since the temperature thereof is only somewhat below the 300° F.; whereby the charging rate of the charging capacitor 100 is established primarily by the resistance sections 75 and 76. Accordingly, the charging capacitor 100 is very quickly charged, in about 4 seconds, again rendering conductive the tube 95 so that the ratchet wheel 79 is again operated into its "odd" position effecting opening of the front contacts 91 and 93 and closing of the back contacts 92 and 94.

Thence forward, the above-described cycle is repeated; whereby the ratchet wheel 79 is alternately operated into its "even" and "odd" positions effecting connection and disconnection of the parallel connected coil sections 24 and 25 with respect to the line conductors 63 and 64 and effecting alternate charging of the charging capacitor 100 via the alternative and initial charging circuits. In the present example, the ratchet wheel 79 may remain in its "even" position 4 seconds and in its "old" position about 52 seconds; whereby the parallel connected coil sections 24 and 25 are connected across the line conductors 63 and 64 about 7.2% of the time so that they develop approximately an average of 147 watts for the purpose of maintaining the temperature of the cooking vessel at the previously set 300° F.

In view of the foregoing, it will be understood that the primary function of the thermistor 49 is to cause the relay 62 to remain in its "even" position for a considerable time interval after it is operated for the first time from its "odd" position as a consequence of operation of the selector switch 20 from its "off" position into its variable "on" position so that the subsequent stepping of the relay 62 is delayed until the temperature of the cooking vessel supported by the coil sections 24 and 25 is elevated well above the ambient temperature and to a temperature somewhat below the desired cooking temperature set by the selector switch 20. Thereafter, and when the cooking vessel is relatively hot, substantially at the preselected cooking temperature, the thermistor 49 loses its blocking control so that the effective control is brought about by the resistance of the resistance sections 75 and 76, together with the resistance of the fixed resistor 102. Specifically, the alternative charging circuit for the charging capacitor 100 includes in series relation the fixed resistor 102, the thermistor 49, and the resistance sections 75 and 76; whereby, after the preliminary heating of the cooking vessel supported by the coil sections 24 and 25, the timing characteristic of the alternative charging circuit is established fundamentally by the resistance of the resistor 102 and the resistance of the resistance sections 75 and 76. Moreover the resistance of the resistance section 76 is variably set depending upon the initial setting of the selector switch 20; whereby this resistance of the variable resistance section 76 is set at a temperature appropriate to establish the point at which the thermistor 49 loses its blocking control. On the other hand, the normal charging circuit for the charging capacitor 100 includes only the resistance sections 73 and 74; and the resistance of the variable resistance section 74 is appropriately set incident to setting of the selector switch 20 to establish a variable time in which the relay 62 occupies its "odd" position in the normal cycle of operation thereof.

Recapitulating, after the thermistor 49 loses its blocking control, the control circuit functions fundamentally as a timer circuit causing the relay 62 to occupy its "even" positions energizing the coil sections 24 and 25 for a fixed time interval of 4 seconds, based fundamentally upon the resistance of the fixed resistor 102, and causing the relay 62 to occupy its "odd" positions deenergizing the coil sections 24 and 25 for a preselected time interval, depending upon the resistance of the resistance sections 73 and 74, and fundamentally upon the resistance of the variable resistance section 74 as determined by the setting of the selector switch 20. Thus in this manner, employing the fixed "on" time of 4 seconds of the coil sections 24 and 25 and the preselected "off" time of 52 seconds, etc., of the coil sections 24 and 25, the average effective wattage thereof can be readily established by selective operation of the selector switch 20; whereby the corresponding effective temperature of the cooking vessel supported by the coil sections 24 and 25 may be selectively established and maintained. Specifically, after the cycle is initiated, the "on" time of the coil sections 24 and 25 is fixed and is established fundamentally by the capacitance of the charging capacitor 100 and the resistance of the fixed resistor 102; while the "off" time of the coil sections 24 and 25 is preselected and is established fundamentally by the capacitance of the charging capacitor 100 and the resistance of the resistance sections 73 and 74, the resistance sections 74 being variable depending upon the adjusted "on" position of the selector switch 20. From the above, it will be understood that the thermistor 49 blocks the normal timing operation of the control circuit only at the beginning of a cooking operation and until the temperature of the cooking vessel is somewhat below that previously set by the selector switch 20; and thereafter, the control circuit in its normal timing operation carries out the fixed "on" time and the preselected "off" time of the coil sections 24 and 25, in the manner described above.

Employing the circuit arrangement described, it was found in a series of tests utilizing a cast iron skillet as a cooking vessel that the following temperature-off time relations existed, the surface heating unit having the wattage of 2050 watts, and the circuit maintaining a fixed "on" time of 4 seconds:

| Temperature in ° F. maintained inside of the skillet | Off time in seconds of the control circuit |
| --- | --- |
| 150 | 180 |
| 200 | 117 |
| 250 | 77 |
| 300 | 52 |
| 350 | 34 |
| 400 | 22 |
| 450 | 15 |

In order to arrest the cooking operation that is being carried out upon the surface heating unit 15, it is only necessary for the person to operate the selector switch 20 back into its "off" position; whereby the wiper 68 disengages the arcuate "on" contact segment 72 and re-engages the "off" contact button 71. At this time the ratchet wheel 79 may occupy its "odd" step or its "even" step. In the event the ratchet wheel 79 occupies its normal "odd" step, the push rod 88 cooperates with a low notch 87 in the control cam 78; whereby the front contacts 91 and 93 are opened, so that there is no further operation of the relay 62. On the other hand, in the event the ratchet wheel 79 occupies its operated "even" step, the push rod 88 cooperates with a high notch 86 in the control cam 78; whereby the front contacts 91 and 93 are closed; and in this event, a direct reset circuit is completed for rendering conductive the tube 95 and for energizing the winding 80; this reset circuit extending from the line conductor 63 via the resistance section 75; the wiper 70, the thermistor 49, the conductor 108, the rectifier 99, the conductor 109, the winding 80, the tube 95, the conductor 110, the wiper 68 and the engaged "off" contact button 71, the resistor 103, the conductor 107 and the front contact 93 to the line conductor 64. Accordingly, the tube 95 is rendered conductive and the winding 80 is energized so as to effect operation of the ratchet wheel 79 from its "even" step back into its "odd" step bringing about the opening of the front contacts 91 and 93 and the closing of the back contacts 92 and 94, as previously explained.

In view of the foregoing, it is apparent that there has been provided in heating apparatus, an improved circuit control arrangement for effecting rapid heating of the heating unit from an ambient temperature to a preselected variable cooking temperature and then for modulating the wattage supplied to the heating unit in accordance with a preselected average value for the purpose of maintaining the previously selected cooking temperature.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. In electric heating apparatus including an electric heating unit adapted to support a vessel to be heated, a source of electric power, and a power switch operative between an open position disconnecting said heating unit from said source and a closed position connecting said heating unit to said source; the combination comprising a control switch having an off position and an on position, a cyclically operative timer establishing in each cycle of operation thereof alternate first and second predetermined time intervals, means responsive to operation of said control switch from its off position into its on position for operating said power switch from its open position into its closed position and for conditioning said timer for cyclic operation, a temperature sensing element operative into a control condition in response to heating to a predetermined relatively high temperature of a vessel supported by said heating unit, means governed by operation of said temperature sensing element into its control condition for initiating cyclic operation of said conditioned timer, means controlled by said cyclic operation of said timer for operating said power switch alternately between its closed and open positions so that said power switch occupies its closed and open positions respectively during said established first and second predetermined time intervals, and means responsive to operation of said control switch from its on position into its off position for arresting cyclic operation of said timer and for operating said power switch from its closed position into its open position.

2. In electric heating apparatus including an electric heating unit adapted to support a vessel to be heated, a source of electric power, and a power switch operative between an open position disconnecting said heating unit from said source and a closed position connecting said heating unit to said source; the combination comprising a control switch having an off position and an on position, a cyclically operative timer establishing in each cycle of operation thereof alternate first and second predetermined time intervals, means responsive to operation of said control switch from its off position into its on position for operating said power switch from its open position into its closed position and for conditioning said timer for cyclic operation, a temperature sensing element operative into a control condition in response to heating to a predetermined relatively high temperature of a vessel supported by said heating unit, means governed by operation of said temperature sensing element into its control condition for initiating cyclic operation of said conditioned timer, means controlled by said cyclic operation of said timer for operating said power switch alternately between its closed and open positions so that said power switch occupies its closed and open positions respectively during said established first and second predetermined time intervals, means for selectively presetting the cycle of operation of said timer so as selectively to preset within a given range the ratio between said first and second predetermined time intervals, and means responsive to operation of said control switch from its on position into its off position for arresting cyclic operation of said timer and for operating said power switch from its closed position into its open position.

3. In elecric heating apparatus including an electric heating unit adapted to support a vessel to be heated, a source of electric power, and a power switch operative between an open position disconnecting said heating unit from said source and a closed position connecting said heating unit to said source; the combination comprising a control switch having an off position and an on position, a cyclically operative timer establishing in each cycle of operation thereof alternate first and second predetermined time intervals, means responsive to operation of said control switch from its off position into its on position for operating said power switch from its open position into its closed position and for conditioning said timer for cyclic operation, a temperature sensing element operative into a control condition in response to heating to a predetermined relatively high temperature of a vessel supported by said heating unit, means governed by operation of said temperature sensing element into its control condition for initiating cyclic operation of said conditioned timer, means controlled by said cyclic operation of said timer for operating said power switch alternatively between its closed and open positions so that said power switch occupies its closed and open positions respectively during said established first and second predetermined time intervals, means for selectively presetting the cycle of operation of said timer so that said first predetermined time interval is fixed and said second predetermined time interval is preset within a given range, and means responsive to operation of said control switch from its on position into its off position for arresting cyclic operation of said timer and for operating said power switch from its closed position into its open position.

4. In electric heating apparatus including an electric heating unit adapted to support a vessel to be heated, a source of electric power, and a power switch operative between an open position disconnecting said heating unit from said source and a closed position connecting said heating unit to said source; the combination comprising a control switch having an off position and a variable on position, a cyclically operative timer establishing in each cycle of operation thereof alternate first and second predetermined time intervals, means responsive to operation of said control switch from its off position into its on position for operating said power switch from its open position into its closed position and for conditioning said timer for cyclic operation, a temperature sensing element operative into a control condition in response to heating to a predetermined relatively high temperature of a vessel supported by said heating unit, means governed by operation of said temperature sensing element into its control condition for initiating cyclic operation of said conditioned timer, means controlled by said cyclic operation of said timer for operating said power switch alternately between its closed and open positions so that said power switch occupies its closed and open positions respectively during said established first and second predetermined time intervals, means governed by said control switch in its variable on position for selectively presetting the cycle of operation of said timer so as selectively to preset within a given range the ratio between said first and second predetermined time intervals, and means responsive to operation of said control switch from its on position into its off position for arresting cyclic operation of said timer and for operating said power switch from its closed position into its open position.

5. In electric heating apparatus including an electric heating unit adapted to support a vessel to be heated, a source of electric power, and a power switch operative between an open position disconnecting said heating unit from said source and a closed position connecting said heating unit to said source; the combination comprising a control switch having an off position and an on position, a cyclically operative timer establishing in each cycle of operation thereof alternate first and second predetermined time intervals, means responsive to operation of said control switch from its off position into its on position for operating said power switch from its open position into its closed position and for conditioning said timer for cyclic operation, a temperature sensing element operative into a control condition in response to heating to a predetermined relatively high temperature of a vessel supported by said heating unit, means for selectively presetting within a given range said predetermined relatively high temperature, means governed by operation of said temperature sensing element into its control condition for initiating cyclic operation of said conditioned timer, means controlled by said cyclic operation of said timer for operating said power switch alternately between its closed and open positions so that said power switch occupies its closed and open positions respectively during said established first and second predetermined time intervals, and means responsive to operation of said control switch from its on position into its off position for arresting cyclic operation of said timer and for operating said power switch from its closed position into its open position.

6. In electric heating apparatus including an electric heating unit adapted to support a vessel to be heated, a source of electric power, and a power switch operative between an open position disconnecting said heating unit from said source and a closed position connecting said heating unit to said source; the combination comprising a control switch having an off position and a variable on position, a cyclically operative timer establishing in each cycle of operation thereof alternate first and second predetermined time intervals, means responsive to operation of said control switch from its off position into its on position for operating said power switch from its open position into its closed position and for conditioning said timer for cyclic operation, a temperature sensing element operative into a control condition in response to heating to a predetermined relatively high temperature of a vessel supported by said heating unit, means governed by said control switch in its variable on position for selectively presetting within a given range said predetermined relatively high temperature, means governed by operation of said temperature sensing element into its control condition for initiating cyclic operation of said conditioned timer, means controlled by said cyclic operation of said timer for operating said power switch alternately between its closed and open positions so that said power switch occupies its closed and open positions respectively during said established first and second predetermined time intervals, and means responsive to operation of said control switch from its on position into its off position for arresting cyclic operation of said timer and for operating said power switch from its closed position into its open position.

7. In electric heating apparatus including an electric heating unit adapted to support a vessel to be heated, a source of electric power, and a power switch operative between an open position disconnecting said heating unit from said source and a closed position connecting said heating unit to said source; the combination comprising a control switch having an off position and a variable on position, a cyclically operative timer establishing in each cycle of operation thereof alternate first and second predetermined time intervals, means responsive to operation of said control switch from its off position into its on position for operating said power switch from its open position into its closed position and for conditioning said timer for cyclic operation, a temperature sensing element operative into a control condition in response to heating to a predetermined relatively high temperature of a vessel supported by said heating unit, means governed by said control switch in its variable on position for selectively presetting within a given range said predetermined relatively high temperature, means governed by operation of said temperature sensing element into its control condition for initiating cyclic operation of said conditioned timer, means controlled by said cyclic operation of said timer for operating said power switch alternately between its closed and open positions so that said power switch occupies its closed and open positions respectively during said established first and second predetermined time intervals, additional means governed by said control switch in its variable on position for selectively presetting the cycle of operation of said timer so as selectively to preset the ratio between said predetermined first and second time intervals, and means responsive to operation of said control switch from its on position into its off position for arresting cyclic operation of said timer and for operating said power switch from its closed position into its open position.

8. The electric heating apparatus combination set forth in claim 1, wherein said temperature sensing element is essentially in the form of a resistor having a high negative temperature coefficient of resistance.

9. The electric heating apparatus combination set forth in claim 1, wherein said temperature sensing element is essentially in the form of a thermistor.

10. The electric heating apparatus combination set forth in claim 1, wherein said power switch is essentially in the form of an electromagnetic relay of the stepping type operative in odd and even steps respectively into its open and closed positions.

11. In electric heating apparatus including an electric heating unit adapted to support a vessel to be heated, a source of electric power, and a power switch operative between an open position disconnecting said heating unit from said source and a closed position connecting said heating unit to said source; the combination comprising a control switch having an off position and an on position, a capacitor, an electron discharge device, means responsive to operation of said control switch into its on and off positions for respectively connecting and disconnecting said capacitor with respect to said device, said capacitor when both fully charged and connected to said device effecting firing thereof, firing of said device effecting discharge of said connected capacitor, means responsive to successive firings of said device for operating said power switch alternately between its open and closed positions, a first circuit including first and second series related resistors for charging said capacitor, said first resistor having a high negative temperature coefficient of resistance and being arranged in heat exchange relation with a vessel supported by said heating unit, a second circuit including a third resistor for charging said capacitor, said power switch in its closed and open positions respectively completing said first and second charging circuits, full charging of said capacitor via said first charging circuit requiring respective long and short time intervals depending upon respective low and high temperatures of said first resistor, full charging of said capacitor via said second charging circuit requiring an intermediate time interval, and additional means responsive to operation of said control switch into its off position when said power switch occupies its closed position for firing said device.

12. The electric heating apparatus combination set forth in claim 11, and further comprising means for selectively varying said second resistor so as selectively to vary said long time interval of charging of said capacitor via said first charging circuit in order selectively to preset within a given range the high temperature control of said first resistor.

13. The electric heating apparatus combination set forth in claim 11, and further comprising means for selectively varying said third resistor so as selectively to vary said intermediate time interval and consequently to preset within a given range the ratio between said short time interval and said intermediate time interval.

References Cited in the file of this patent

UNITED STATES PATENTS

| | | |
|---|---|---|
| 2,215,404 | Myers | Sept. 17, 1940 |
| 2,431,195 | Olving | Nov. 18, 1947 |
| 2,500,061 | Clark | Mar. 7, 1950 |
| 2,501,499 | Crowley | Mar. 21, 1950 |
| 2,510,041 | Rudahl | May 30, 1950 |
| 2,524,506 | Akeley | Oct. 3, 1950 |
| 2,623,976 | Miles | Dec. 30, 1952 |